United States Patent [19]

Belfoure et al.

[11] Patent Number: 4,469,850

[45] Date of Patent: Sep. 4, 1984

[54] COMPOSITIONS

[75] Inventors: Edward L. Belfoure, New Harmony; Kenneth F. Miller, Mt. Vernon, both of Ind.

[73] Assignee: General Electric Company, Mt. Vernon, Ind.

[21] Appl. No.: 439,575

[22] Filed: Nov. 5, 1982

[51] Int. Cl.³ .................. C08L 67/02; C08L 69/00
[52] U.S. Cl. .................... 525/439; 524/537
[58] Field of Search ........................ 525/439

[56] References Cited

U.S. PATENT DOCUMENTS

| | | | |
|---|---|---|---|
| 4,226,961 | 10/1980 | Motz | 525/439 |
| 4,238,596 | 12/1980 | Quinn | 525/439 |
| 4,238,597 | 12/1980 | Markezich | 525/439 |
| 4,297,455 | 10/1981 | Lindner | 525/439 |
| 4,360,648 | 11/1982 | Jackson | 525/439 |
| 4,369,303 | 1/1983 | Mori | 525/439 |

FOREIGN PATENT DOCUMENTS

| | | | |
|---|---|---|---|
| 4020 | 9/1979 | European Pat. Off. | 525/439 |
| 55-131048 | 10/1980 | Japan | |
| 55-133445 | 10/1980 | Japan | 525/439 |

Primary Examiner—John C. Bleutge
Assistant Examiner—Patricia Short
Attorney, Agent, or Firm—Martin B. Barancik

[57] ABSTRACT

Good impact resistance is obtained with blends of polycarbonate and aromatic copolyester carbonate with preferred composition exhibiting a substantial ductile failure mode at break.

10 Claims, No Drawings

COMPOSITIONS

BACKGROUND OF THE INVENTION

Aromatic copolyestercarbonates are well known as copolymers derived from carbonate precursors, dihydric phenols and aromatic dicarboxylic acid or acid derivatives. Among the properties characterizing these polymers is a relatively high distortion temperature under load (DTUL) as well as a relatively high impact strength as measured by a notched Izod test system. The impact failure mode, however, for both the ⅛ and ¼ inch test pieces is brittle as opposed to ductile.

Aromatic polycarbonates are also well known polymers derived from carbonate precursors and dihydric phenols. Among the properties characterizing these polymer is a DTUL significantly lower than an aromatic copolyester carbonate and a high resistance to impact in thin section, i.e. a ⅛ inch test system which also involves a ductile failure mode. However as in the nature of most glassy polymers, aromatic polycarbonates have a critical thickness beyond which impact strength drops quite rapidly and the failure mode changes from ductile to brittle. The notched Izod test system utilizing ¼ inch test samples is beyond this critical thickness and such tests show a relatively low impact strength with brittle failure mode.

A blending of two polymers generally results in an admixture, assuming good compatibility of the blend components, which is characterized by properties somewhere between the properties of the individual blend components. The value of the specific property under investigation is generally dependent upon the percent of each component in the blend. It has now been found that when certain aromatic polycarbonates are blended in intimate admixture with certain aromatic copolyestercarbonates over a specific percentage ester range, the impact resistance of the composition is higher than either of the individual components as measured by the ¼ inch notched Izod test. Additionally, the failure mode tends to be more ductile than brittle over a relatively narrow range.

SUMMARY OF THE INVENTION

In accordance with the invention, there is a composition comprising an intimate admixture of
  a. a halogen free, unbranched aromatic polycarbonate derived from a dihydric phenol and a carbonate precursor and having an intrinsic viscosity of at least about 0.52 dl/g, and
  b. a halogen free unbranched aromatic copolyester carbonate derived from a dihydric phenol, a carbonate precursor, and an aromatic dicarboxylic acid or reactive derivative thereof selected from the group consisting of terephthalic acid or mixture of isophthalic and terephthalic acid;

said aromatic polycarbonate and aromatic copolyester carbonate present in such quantities that the ¼ inch notched Izod impact strength of the composition is higher than that of component a or component b alone.

Preferred compositions will also exhibit a greater tendency to break in the ductile failure mode rather than the brittle failure mode in ¼" molded articles. The individual components of the composition exhibit a brittle failure mode. This ductile failure mode of the composition is at least partially dependent upon the intrinsic viscosity of the aromatic polycarbonate.

DETAILED DESCRIPTION OF THE INVENTION

Aromatic polycarbonates useful in the composition of this invention are the usual polycarbonates known to those of skill in the art. However the polycarbonates should neither be branched, i.e, no tri functional or higher functionality agent which can impact a branch into the polycarbonate should be present, nor should they be halogenated. Typical dihydric phenols which can be employed are 2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-propylphenyl)methane;
bis(4-hydroxy-2,6-dimethyl-3-methoxyphenyl)methane
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be employed. Examples of such groups of bisphenols include bis(hydroxyphenyl) sulfides, bis(hydroxyphenyl)ethers and bis(hydroxyphenyl) sulfoxides and the like.

The preferred family of dihydric phenols is illustrated below

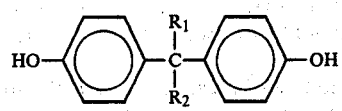

wherein $R_1$ and $R_2$ are the same or different and are hydrogen or alkyl of one to six carbon atoms, inclusive. The most preferred dihydric phenol is bisphenol A.

The aromatic polycarbonates are prepared by the standard techniques, for example interfacial polymerization in the presence of an amine catalyst and an acid acceptor. The aromatic polycarbonates generally useful in this invention have an intrinsic viscosity (I.V.) of at least about 0.52 deciliters/gm (dl/g) as measured in methylene chloride at 25° C. Preferred intrinsic viscosity is above about 0.55 dl/g. When polycarbonates of the preferred intrinsic viscosities are employed in the blend over a relatively narrow percentage range of ester content the impact failure at ¼ inch thickness is generally more ductile than brittle. It should also be noted that the impact resistance is significantly higher as well. With polycarbonates of lower intrinsic viscosity, for example 0.52 dl/g the impact failure remains in the brittle mode at ¼ inch. Blends of the appropriate polycarbonates may also be employed.

The aromatic copolyester carbonates suitable for use in this invention are derived from carbonate precursors and dihydric phenols which are also useful in preparing the aromatic polycarbonate. However the aromatic copolyester carbonate need not be prepared from the same dihydric phenol as used in the aromatic polycarbonate present in the invention composition. The aromatic dicarboxylic acids employed in the preparation of the copolyester carbonate are terephthalic acid or mixtures of isophthalic and terephthalic acid. Any derivative of a carboxylic acid which is reactive with the hydroxyl of a dihydric phenol may be employed. The acid halides are generally employed because of their ease of reactivity and availability. The acid chlorides are preferred.

The ester content of the aromatic copolyester carbonate should be in a range of from about 25 to about 90 mol percent, preferably from about 35 to about 80 mol percent. When a mixture of isophthalic and terephthalic acids are present in the polymer a range of from about 1:9 to 8:2 isophthalic to terephthalic acid can be employed. A preferred range is from about 1:9 to about 4:6.

The standard methods for preparing copolyester carbonate can be employed. Such methods are found in U.S. Pat. Nos. 3,169,121 and 4,238,596.

Any combination of the aromatic polycarbonate and aromatic copolyester carbonate which provide a ⅛ inch notched Izod impact strength greater than obtained with either blend component alone is within the scope of the invention. Obviously the specific boundaries of this effect will depend upon the structural composition of the specific aromatic polycarbonate and aromatic copolyester carbonate as well as their individual properties. In general, these surprising impact results can be obtained with compositions having from about 10 to about 70 weight percent ester content, based on the total weight percent of aromatic polycarbonate and aromatic copolyester carbonate present in the composition, preferably from about 15 to about 60 weight percent ester content. The preferred compositions having a more ductile failure mode the ⅛ inch thickness generally have an ester content of from about 18 to about 36 weight percent ester and the aromatic polycarbonate has a minimum I.V. of about 0.55 dl/g, preferably about 0.60 dl/g.

Any method can be used to obtain the intimate admixture of the composition. For example, melt blending in an ordinary extruder or double screw extruder brings about an appropriate admixture. Additionally various stabilizers and additives may also be present in the composition. These additives are preferably added at the extrusion step. The typical stabilizers employed for color, thermal, hydrolytic and ultra violet stabilization of polycarbonates and copolyester carbonates may be employed in the composition. Various additives such as mold release, agents, pigments and flame retardants, particularly salts of aromatic sulfonic acids, can also be present.

SPECIFIC EXAMPLES

Below are specific examples of the invention and comparative examples. These examples are intended to illustrate the invention rather than narrow the inventive concept disclosed herein.

Preparation 1

The polycarbonate is prepared by standard interfacial techniques utilizing bisphenol A, phosgene and phenol as chain terminator. The aromatic copolyester carbonate is prepared by standard technique for example as in U.S. Pat. No. 4,238,596. The copolyester carbonate employed in the examples has a mole percent ester content of about 65 mole percent (72.4 weight percent), the esters being a mixture of 85 percent terephthalic acid and 15 percent isophthalic acid. Phosgene and bisphenol A are the carbonate precursor and dihydric phenol employed. The ester content in the composition is weight percent, based upon the total amount of polycarbonate and copolyester carbonate. For example a blend of 50 weight percent polycarbonate with 50 weight percent of the copolyester carbonate identified in this preparation will have a 36.2 weight percent ester content.

Standard quantities of a phosphite stabilizer, an epoxide stabilizer and a silicone were extruded with the resins.

In Table I below, the polycarbonate has an intrinsic viscosity of about 0.63. In all the Tables below the % polycarbonate refers to the weight percent of polycarbonate in the composition of polycarbonate and copolyester carbonate. The DTUL is in degrees centigrade and measured according to ASTM D648. The notched Izod is measured in foot-lbs/in according to ASTM D256. The superscript represents percent ductility of five samples.

TABLE I

|  | A | Ex. 1 | Ex. 2 | Ex. 3 | Ex. 4 | B |
|---|---|---|---|---|---|---|
| % Polycarbonate | 0 | 20 | 40 | 60 | 80 | 100 |
| Wt % ester | 72.4 | 58 | 43 | 29 | 15 | 0 |
| DTUL | 165 | 156 | 151 | 145 | 139 | 130 |
| ⅛"Notched Izod | 6.0$^0$ | 8.3$^0$ | 10.6* | 13.1* | 16.1* | 16.1* |
| ¼"Notched Izod | 6.0$^0$ | 7.4$^0$ | 8.5$^0$ | 10.1$^{80}$ | 3.1$^0$ | 2.1$^0$ |

*100% ductile

As is observed from the data, the DTUL and ⅛ inch Notched Izod values changes as expected, the more polycarbonate the lower the DTUL and the higher the impact resistance. However, the ¼ inch notched Izod impact strength values and mode failure are indeed surprising. The expected decreased ¼ inch impact strength with steadily increasing quantities of polycarbonate is not observed. Rather, in a range of from about 10 to about 70 weight percent ester content, preferably about 20 to about 60, the ¼ inch notched Izod impact value is higher than for each individual component alone. Particularly noteworthy is that the failure mode changes from 100% brittle to substantially ductile over a relatively narrow composition range of from about 18 to about 36 weight percent ester content.

The above experiments were repeated with an aromatic polycarbonate of intrinsic viscosity of 0.56 dl/g replacing the previous aromatic polycarbonate. Below are the results

TABLE II

|  | A | Ex. 5 | Ex. 6 | Ex. 7 | Ex. 8 | B |
|---|---|---|---|---|---|---|
| % Polycarbonate | 0 | 20 | 40 | 60 | 80 | 100 |
| Wt % ester | 72.4 | 58 | 43 | 29 | 15 | 0 |
| DTUL | 165 | 153 | 151 | 145 | 139.0 | 130 |
| ⅛"Notched Izod | 6.0$^0$ | 8.3$^{40}$ | 10.0* | 12.5* | 15.1* | 16.0* |
| ¼"Notched Izod | 6.0$^0$ | 7.3$^0$ | 8.6$^0$ | 9.6$^{40}$ | 2.5$^0$ | 2.1$^0$ |

*100% Ductile

The results show the same trend as in Table I. The DTUL is steadily lowered as polycarbonate content of the composition increases. The ⅛ inch Notched Izod impact values of the composition increase. However, the impact resistance is surprisingly higher together with an increase in ductility as shown in the specific value for ¼ inch.

Quite clearly articles of a thickness of ¼ inch or somewhat higher or lower molded from these compositions having certain minimum I.V. polycarbonate will have surprising impact strength and in a narrower range increased ductility upon failure in comparison with articles molded from either composition component.

Various percentage of terephthalic acid residue and mixture of isophthalic and terephthalic acid residue aromatic copolyester carbonates are combinable with the aromatic polycarbonate to obtain compositions having this surprising impact resistance feature and even more preferable ductile failure mode.

Below is a comparative experiment utilizing a polycarbonate having an I.V. which is too low, 0.50 dl/g.

TABLE III

|  | A | C | D | E | B |
|---|---|---|---|---|---|
| % Polycarbonate | 0 | 20 | 45 | 60 | 100 |
| Wt % ester | 72.4 | 58 | 40 | 29 | 0 |
| DTUL | 165 | 157 | 150 | 145 | 130 |
| ⅛"Notched Izod | $6.0^0$ | $6.6^0$ | $8.7^{60H*}$ | $10^{100H*}$ | $16.0^{100}$ |
| ¼"Notched Izod | $6.0^0$ | $5.6^0$ | $6.6^0$ | $5.7^0$ | $2.1^0$ |

*Hinged Break (not ductile)

As is observed from the above data, the ⅛ inch Notched Izod never becomes ductile as shown in previous Tables I and II. Moreover, there is very little rise if any above the 100% copolyester carbonate value for ¼ inch Notched Izod values of the blend. Clearly there is no change to the ductile failure mode in the ¼ inch test samples as opposed to the blends of Tables I and II utilizing the higher I.V. polycarbonates.

Although an upper limit on the polycarbonate intrinsic viscosity of this invention is not unduly significant, generally an intrinsic viscosity of about 1.20 dl/g preferably about 0.80 dl/g should not be exceeded.

What is claimed is:

1. A composition comprising an intimate admixture of
   a. a halogen free, unbranched aromatic polycarbonate derived from a dihydric phenol and a carbonate precursor, having an intrinsic viscosity of at least about 0.60 dl/g in methylene chloride at 25° C., and
   b. a halogen free unbranched aromatic copolyester carbonate derived from a dihydric phenol, a carbonate precursor, and an aromatic dicarboxylic acid or reactive derivative thereof selected from the group consisting of terephthalic acid or a mixture of isophthalic and terephthalic acid;
   said aromatic polycarbonate and aromatic copolyester carbonate present in such quantities that the ⅛ inch notched Izod impact strength of the composition is higher than that of component a alone or component b alone and the ¼ inch notched Izod impact test failure mode is substantially ductile.

2. The composition in accordance with claim 1 wherein the aromatic polycarbonate is derived from a dihydric phenol of the formula

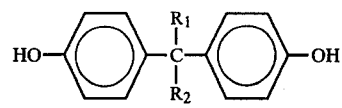

wherein $R_1$ and $R_2$ are the same or different and are hydrogen or alkyl of one to six carbon atoms, inclusive.

3. The composition in accordance with claim 2 wherein the dihydric phenol is bisphenol A.

4. The composition in accordance with claim 2 wherein the aromatic copolyester carbonate is derived from a mixture of isophthalic acid chloride and terephthalic acid chloride.

5. The composition in accordance with claim 3 wherein the aromatic copolyester carbonate is derived from a mixture of isophthalic acid chloride and terephthalic acid chloride.

6. The composition in accordance with claim 2 wherein in the aromatic copolyester carbonate the dihydric phenol is derived from bisphenol A.

7. The composition in accordance with claim 5 wherein in the aromatic copolyester carbonate the dihydric phenol is derived from bisphenol A.

8. The composition in accordance with claim 2 wherein the weight percent of ester content is from about 18 to about 36 weight percent, the weight percent based on the total weight percent of the aromatic polycarbonate and aromatic copolyester carbonte present in the composition.

9. A shaped article molded from the composition of claim 1.

10. A shaped article molded from the composition of claim 3.

* * * * *